United States Patent
Willey et al.

(10) Patent No.: US 8,064,879 B2
(45) Date of Patent: Nov. 22, 2011

(54) MOBILE CERTIFICATE DISTRIBUTION IN A PKI

(75) Inventors: William Daniel Willey, San Francisco, CA (US); Simon Blake-Wilson, Toronto (CA)

(73) Assignee: Certicom Corp., Mississauga, Ontario (CA)

(*) Notice: Subject to any disclaimer, the term of this patent is extended or adjusted under 35 U.S.C. 154(b) by 0 days.

(21) Appl. No.: 12/852,308

(22) Filed: Aug. 6, 2010

(65) Prior Publication Data

US 2010/0306546 A1    Dec. 2, 2010

Related U.S. Application Data

(63) Continuation of application No. 12/071,576, filed on Feb. 22, 2008, now Pat. No. 7,787,865, which is a continuation of application No. 10/634,881, filed on Aug. 6, 2003, now Pat. No. 7,356,329, which is a continuation of application No. PCT/CA02/00130, filed on Feb. 5, 2002.

(60) Provisional application No. 60/266,481, filed on Feb. 6, 2001.

(51) Int. Cl.
*H04M 1/66* (2006.01)
*H04K 3/00* (2006.01)

(52) U.S. Cl. ....... 455/410; 455/41.2; 455/411; 380/247; 713/168

(58) Field of Classification Search ........ 455/41.2–41.3, 455/410–411; 380/247, 270; 713/168–172
See application file for complete search history.

(56) References Cited

U.S. PATENT DOCUMENTS

| 6,516,316 B1* | 2/2003 | Ramasubramani et al. ......... 1/1 |
| 6,766,160 B1 | 7/2004 | Lemilainen et al. |
| 7,356,329 B2* | 4/2008 | Willey et al. .................. 455/410 |

FOREIGN PATENT DOCUMENTS

| EP | 0942568 A2 | 9/1999 |
| EP | 1081895 A1 | 3/2001 |
| EP | 1102430 A1 | 5/2001 |

OTHER PUBLICATIONS

"Ad hoc On-Demand Distance Vector (AODV) Routing", Internet Draft; Mobile Ad Hoc Networking Working Group, Nov. 24, 2000.
"The Dynamic Source Routing Protocol for Mobile Ad Hoc Networks", Internet Draft, IETF MANET Working Group, Nov. 17, 2000.

(Continued)

*Primary Examiner* — Lee Nguyen
(74) *Attorney, Agent, or Firm* — Novak Druce + Quigg LLP

(57) ABSTRACT

A method of providing certificate issuance and revocation checks involving mobile devices in a mobile ad-hoc network (MANET). The wireless devices communicate with each other via Bluetooth wireless technology in the MANET, with an access point (AP) to provide connectivity to the Internet. A Certificate authority (CA) distributes certificates and certification revocation lists (CRLs) to the devices via the access point (AP). Each group of devices has the name of the group associated with the certificate and signed by the CA. A device that is out of the radio range of the access point may still connect to the CA to validate a certificate or download the appropriate CRL by having all the devices participate in the MANET.

18 Claims, 7 Drawing Sheets

OTHER PUBLICATIONS

Venkatraman, L. et al.: "A Novel Authentication scheme for Ad hoc Networks"; Proceedings of IEEE Wireless Communications and Networking Conference: vol. 3; Sep. 28, 2000; pp. 1268-1273.

Jacobs, S. et al.; "MANET Authentication Architecture"; IETF internet Draft; Mar. 1999; retrieved from the Internet: at http://www.watersprings.org/pub/id/draft-jacobs-imep-auth-arch-00.txt.

Zygmunt, J et al.; "The Zone Routing Protocoi (ZRP) for Ad Hoc Networks"; IETF Internet Draft; Jun. 1999; retrieved from the internet at http://www.watersprings.org/pub/id/draft-ietf-manet-zone-zrp-02.txt.

Wieselthier, J. et al.; "Multicasting in Energy-Limited Ad-Hoc Wireless Networks"; Proceedings of IEEE Military Communications Conference; Boston, Oct. 18-21, 1998; pp. 723-729.

Zhou, L. et al., "Securing Ad Hoc Networks"; IEEE; Nov./Dec. 1999.

* cited by examiner

MOBILE CERTIFICATE DISTRIBUTION IN A PKI

CROSS-REFERENCE TO RELATED APPLICATIONS

This application is a continuation of U.S. patent application Ser. No. 12/071,576 filed on Feb. 22, 2008, which is a continuation of U.S. patent application Ser. No. 10/634,881 filed on Aug. 6, 2003 and issued as U.S. Pat. No. 7,356,329 on Apr. 8, 2008, which is a continuation of PCT International Application No. PCT/CA02/00130 filed on Feb. 5, 2002 which claims priority from U.S. Provisional Application No. 60/266,481 filed on Feb. 6, 2001 all of which are hereby incorporated by reference.

FIELD OF INVENTION

The present invention relates to the field of cryptography and in particular to mobile devices in public key infrastructures.

BACKGROUND OF THE INVENTION

The use of a Certificate Authority (CA) to distribute a public key of a public key/private key pair is well known. A CA distributes public keys by creating and issuing certificates, documents which bind identifying information about a user with the user's public key. Certificates also typically have information about the time period for which they are valid. The public key, the identifying information, the lifetime information, and other information such as a serial number are signed with the CA's private key. The lifetime information, the identifying information, the user's public key, and the signature together form the certificate. Once a user has been issued a certificate, it can be used by anyone who requires his public key; the user can present the certificate to another party or the certificate can be stored in a database and retrieved by the party requiring the certificate. Provided that the other users on the system have valid copies of the CA's public key, a user's public key can be validated by verifying the signature on the certificate with the CA's public key.

Several revocation methods exist to mitigate against the compromise of the private key of a public key/private key pair and to allow a user's authority to use a public key/private key pair to be taken away. One revocation method allows a certificate to be revoked. The CA may publish a certificate revocation list (CRL) containing the serial numbers of the revoked certificates and signed with the CA's private key; the validating party then downloads the CRL and verifies that a certificate is not in the CRL when validating the public key. Typically a CRL has a certain validity period and periodically new CRLs are generated. Another revocation method is to use an online certificate status protocol (OCSP) where the validating party communicates with a trusted online entity that confirms that a certificate has not been revoked. Yet a third revocation method is to use short-lived certificates. With this approach, a CA frequently issues a certificate with a short lifetime. A user retrieves his certificate from the CA after it is generated and presents the latest short-lived certificate to the validating party. If certification is to be revoked, the CA does not issue further short-lived certificates. Since the current certificate is short-lived, it will soon expire and it will no longer be possible to validate the public key using the certificate. The short-lived certificate makes it possible for the validating party to accept a certificate with no further checking.

Current revocation methods are not well suited to an environment where neither the presenter of a certificate nor the validating party has a constant connection to the CA or another online entity. An example of such an environment would be two wireless devices communicating solely with one another using Bluetooth wireless technology. For example, if CRLs are used, a device that needs to validate a certificate may be unable to download the appropriate CRL from the CA because it lacks a connection to the Internet. OCSP requires an online check that may not be possible. Short-lived certificates are promising in this environment in that they do not require an online check at the time the certificate is validated, but fetching a new short-lived certificate presents a problem when there is no connection to the CA.

It should be noted that checks of certificate revocation are not currently widely deployed in the wired internet. Server certificates sent to clients have been widely deployed, but client certificates sent to servers have not. As a web server is typically in a secure location and typically uses a costly secure hardware token for private key storage and signing, there is currently a certain degree of built-in security that lessens the need to check for certificate revocation. However for the scenario of one low-cost wireless device presenting a certificate to another low-cost wireless device, the ability to check for certificate revocation becomes more important. In this scenario, it may be too costly to use a secure hardware token and there is also less physical security because the devices may not be in a secure location.

An object of the present invention is to obviate or mitigate the above disadvantages and provide a method and apparatus to facilitate certificate revocation checks between two wireless devices where neither has a constant online connection.

SUMMARY OF THE INVENTION

In general terms the present invention provides a method of distributing certificates to mobile devices by establishing a mobile ad-hoc network (MANET) between a plurality of mobile devices at a predetermined time and distributing a certificate through said mobile ad-hoc network to a respective one of said mobile devices.

In a further aspect the present invention provides a method of distributing certificates in a mobile ad-hoc network having an access point to provide a connection to a communication network and a plurality of mobile devices to be connected to said communication network through said access point, said method comprising the steps of retrieving and storing at said access point certificates associated with respective ones of said devices and forwarding said certificates through said mobile ad-hoc network to said respective device.

In a still further aspect there is provided a method of distributing certificates within a mobile ad-hoc network wherein an online entity associated with a device is responsible for both distributing the device's certificate and for fetching other certificates needed to allow validation by another device in said network.

In a yet further aspect there is provided a method of securely setting a time source in a first device from a second device comprising the steps of: establishing a shared secret between the two devices using certificates; storing the shared secret in a non-volatile memory; a first of said devices authenticating a second of said devices using the shared secret; and transferring the time from the second device to the first device.

The invention also provides a method of validating wherein a certificate presented to a first device by a second device is used for the validation if the second device's certificate has not expired and wherein the first device uses the validation certificate fetched based upon a pointer presented by the second device if the second device's certificate has expired.

A still further aspect of the invention provides a method of distributing certificates wherein a first device cannot retrieve a certificate at a first time because there is no connectivity to the internet comprising the steps of: requesting assistance of other devices if the certificate has still not been received by a second time; having a second device of the other devices request the certificate on behalf of the first device when the second device has connectivity to the internet; having the second device reestablish communication with the first device; and sending the certificate from the second device to the first device.

In a preferred embodiment there is provided a method of providing certificate issuance and revocation checks involving mobile devices in a mobile ad-hoc network (MANET). The wireless devices communicate with each other via a wireless protocol, such as Bluetooth in the MANET, with an access point (AP) to provide connectivity to the Internet. A Certificate authority (CA) distributes certificates and certification revocation lists (CRLs) to the devices via the access point (AP). Each group of devices has the name of the group associated with the certificate and signed by the CA. A device that is out of the radio range of the access point may still connect to the CA to validate a certificate or download the appropriate CRL by having all the devices participate in the MANET.

BRIEF DESCRIPTION OF THE DRAWINGS

These and other features of the preferred embodiments of the invention will become more apparent in the following detailed description in which reference is made to the appended drawings wherein.

DETAILED DESCRIPTION OF THE PREFERRED EMBODIMENTS

Figure 1:
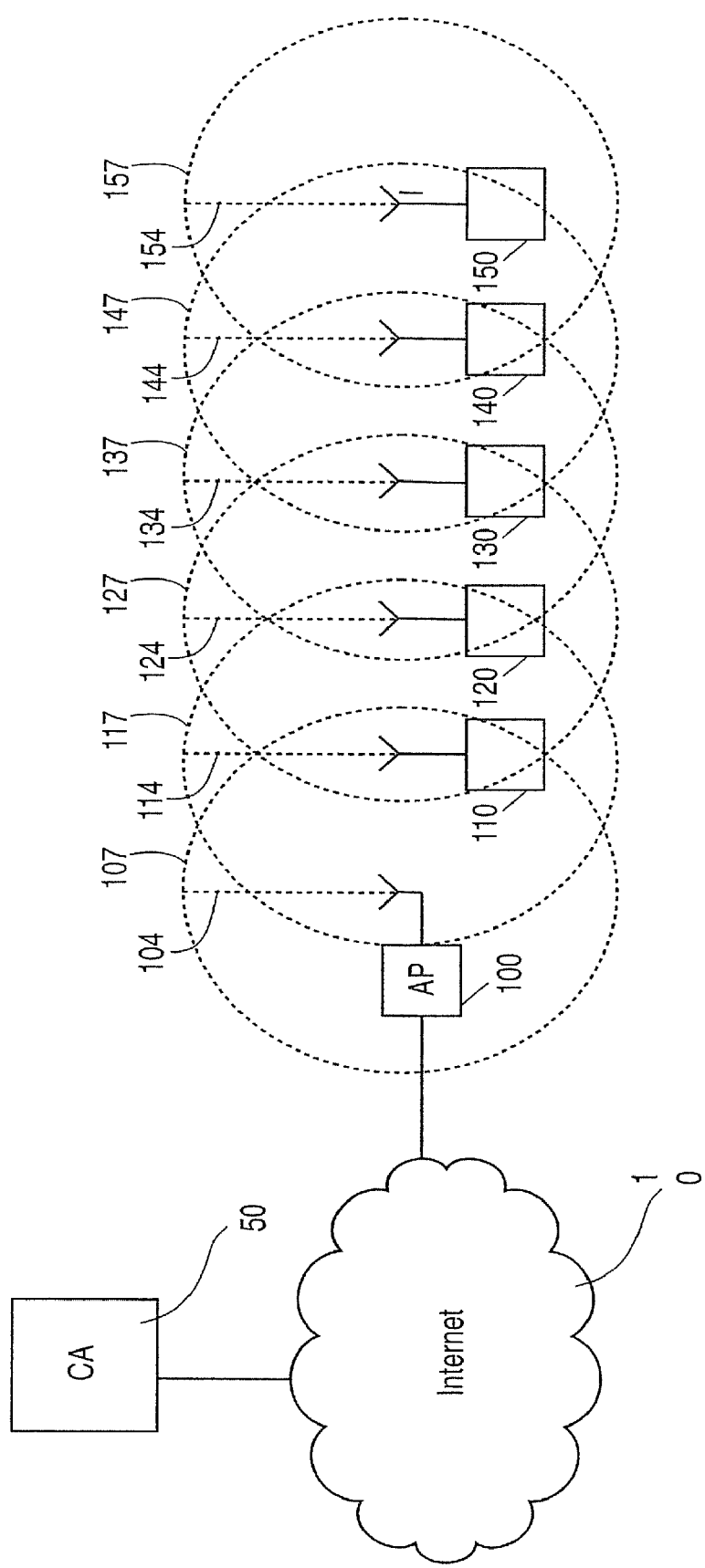
FIG. 1 shows a number of wireless devices communication with each other in an ad-hoc network.

Reference is first made to FIG. 1, which shows wireless devices, 100, 110, 120, 130, 140, and 150 in communication with one another via radios using a wireless protocol, such as the Bluetooth radio specification or one of the IEEE 802.11 physical layer specifications. The devices 100, 110,120,130, 140 and 150 connect to a communication network such as the Internet 10 through one of the nodes identified as an access Point (AP) 100. AP 100 is typically a fixed device with an AC power supply and thus may be assumed to have a constant power supply. The nodes 110, 120, 130, 140, and 150 have no direct connectivity to the internet 10; they are assumed to be mobile devices and having limited power sources such as batteries. The radio in each wireless device is also assumed to have a limited range. In FIG. 1, the range of AP 100 is represented by circle 107 having radius 104. Although, RF propagation is highly variable and dependant on the environment, it is assumed that AP 100 and any wireless device within circle 107 can receive the transmissions of the other nodes within that circle. Similarly it is assumed that AP 100 and any wireless device outside of circle 107 cannot receive the other's transmissions. Nodes 110, 120, 130, 140, and 150 similarly are assumed to have ranges represented by circles 117, 127, 137, 147, and 157, respectively, and having radii 110, 120, 130, 140, and 150, respectively.

Connectivity, between the nodes normally out of range of one another can be obtained by implementation of a routing protocol between the nodes. This connectivity permits multiple devices to be interconnected and have basis to establish empheral or short term networks of collections of mobile devices. These collections of devices are typically referred to as mobile ad-hoc networks or MANET's. The Mobile Ad-hoc Networks (MANET) working group of the IETF is currently developing routing protocols to enable devices such as 110, 120, 130, 140, and 150 to form mobile ad-hoc networks (MANETs) through which they may communicate with one another. As shown in FIG. 1, devices 110 and 130 cannot communicate directly with one another. If devices 110, 120, and 130 implement a MANET routing protocol, device 120 may serve as a router and enable devices 110 and 130 to exchange packets with one another even though they are out of radio range of one another. A MANET may have connectivity to the internet 10 through access points such as 100. In FIG. 1, a MAN ET enables device 150 to send a packet to a node in the internet routed via the following nodes in order: 140, 130, 120, 110, and 100. In a MANET, nodes are free to move around and the routing protocol must adapt. For example, if nodes 140 and 120 changed places with one another a MANET routing protocol would adapt such that device 150 could still send a packet to a node in the internet, but routed via the following nodes in order: 120, 130, 140, 110, and 100. MANETs are described in further detail in RFC2501. A suitable MANET routing protocol is the Ad-hoc On-Demand Distance Vector (AODV) Routing protocol described in draft-ietf dsr-07.txt. This reference, the contents of which are incorporated herein by reference, is available at http://www.ietf.org/internet-drafts/draft-ietf-manet-aodv-07.txt. Another suitable MANET routing protocol is the Dynamic Source Routing Protocol for Mobile Ad-hoc Networks described in draft-ietf manet-dsr-04.txt. This reference, the contents of which are incorporated herein by reference, is available at http://www.ietforg/internet-drafts/draft-ietf manet-dsr-04.txt.

Devices 100, 110, 120, 130, 140, and 150 all are part of a group of devices which can form an ad-hoc network with one another to provide an ad-hoc group indicated by chain dot line 160. Devices in the group 160 have certificates to enable them to authenticate each other and confirm they are part of a privileged group. Since devices 110, 120, 130, 140, and 150 have limited power sources, they may wish to avoid participation in ad-hoc networks with other devices that are not in the group. Devices 110, 120, 130, 140, and 150 may have the capability to participate in an ad-hoc network with one another, but if a device has no application that would make use of an ad-hoc network at a particular time, it may decline to participate because of the drain on its power source that participation would cause.

The Certificate Authority (CA) 50 is responsible for issuing short-lived certificates to the devices and for sending the short-lived certificates to the devices upon request. Since the validity of a certificate depends upon the current time, devices 100, 110, 120, 130, 140, and 150 all have accurate time sources that are always available for validating certificates. In a preferred embodiment, devices 100, 110, 120, 130, 140 and 150 are distinguished as members of an ad-hoc group by giving the group a name, making all of the devices aware of the group name, and including the name in the certificates signed by the CA. When the devices check a certificate for the purpose of authenticating a fellow ad-hoc group member they will verify that the certificate contains the group name.

In an alternate embodiment, the root key of the members' CA defines the membership of a group; all devices having certificates signed by the same CA's private key comprise a group.

Although the functions of issuing short-lived certificates to the devices and for sending the short-lived certificates to the devices are shown as being part of a traditional CA, it should be noted that equivalent functionality could be provided with the addition of an OCSP client. In this case, a CA would not issue short-lived certificates; the certificates issued by a CA would have a long validity period. The CA would act as an OCSP responder and upon request from the OCSP client would indicate whether or not a public key/private key pair is valid. Rather than having a CA issue short-lived certificates, the OCSP client would issue precomputed OCSP responses having the validity period as described for a short-lived certificate. The OCSP client would issue a precomputed OCSP response only if the CA indicates that the public key/private key pair is valid. Rather than fetching a short-lived certificate from a CA, a wireless device could fetch a precomputed OCSP response from an OCSP client. The full certificate issued by the CA could optionally be delivered to the wireless device along with the precomputed OCSP response. This possible use of a precomputed OCSP response rather than a short-lived certificate applies to all figures and descriptions.

If devices 100, 110, 120, 130, 140, and 150 were always in the configuration shown in FIG. 1 and were always participating in an ad-hoc network, retrieval of short-lived certificates would be a simple matter as there is always a route to CA through the internet. However, the mobility of the devices presents difficulties to the retrieval of short-lived certificates. For example, if device 110 were to move out of range of all of the other devices or if it were to decline to participate in the ad-hoc network, devices 120, 130, 140, and 150 would all be unable to fetch their short-lived certificates from CA because they are all out of range of AP. Prolonged lack of ad-hoc activity among all devices followed by a need to establish an ad-hoc network would result in failure if the short lived certificates expired and the devices needing to establish the ad-hoc network were all out of range of AP.

In order to mitigate the problems associated with the lack of a route to the CA when a device needs to fetch its short-lived certificate, all devices are required to participate in a MANET at the same time at periodic predetermined times, provided that other devices are within range. While the devices are participating in the MANET, they fetch their short-lived certificates. This time period during which a MANET is established for the purpose of updating certificates will be referred to as a MANET Establishment Period or MEP. By having all members active in the MANET at the same time, the probability that there will be a route to the CA is maximized. Preferably, the times for which the short-lived certificates are valid are related to the periodic predetermined times of the MEP. For example, the beginning of a short-lived certificate's validity period may correspond to the beginning time of a MEP. Similarly, the ending of a short-lived certificate's validity period may correspond to the end time of a MEP. Preferably, the validity period of a short-lived certificate will have a substantial overlap with subsequently issued short-lived certificates such that a device that has no route to the Internet during one MEP may continue using the short-lived certificate at least until a subsequent MEP as illustrated schematically in FIG. 2.

Figure 2:
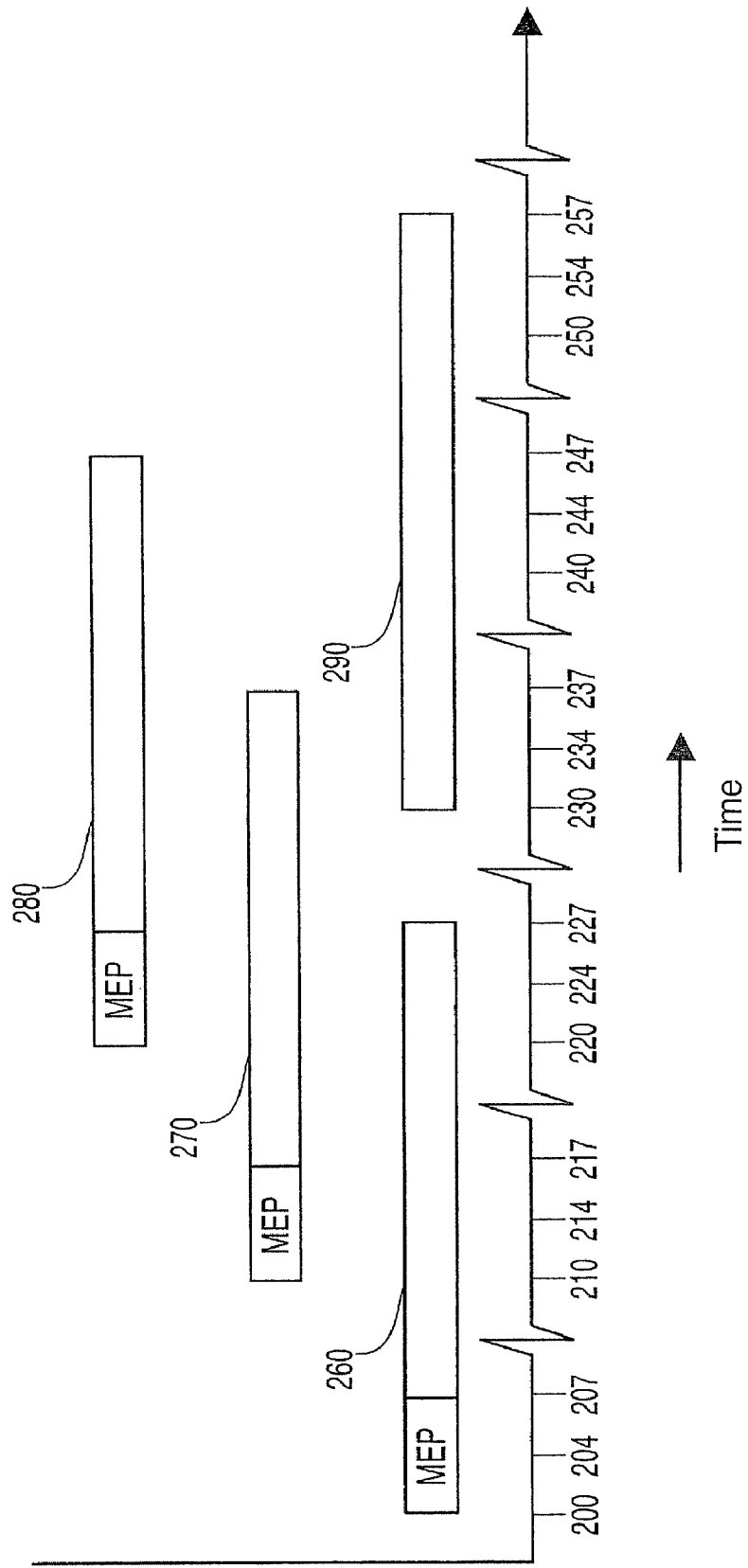
FIG. 2 shows the timeline for a method for distribution of short-lived certificates.

Referring to FIG. 2, time bars 260, 270, 280, and 290, each represent separate time periods for which groups of certificates issued by CA 50 are valid. For example, prior to time 200, CA 50 issues a first group of short-lived certificates, one for each device 100, 110, 120, 130, 140, and 150. Each short-lived certificate in the group is valid beginning at the time period beginning at time 200 and ending at time 227. Similarly there are groups of certificates valid during time bars 270, 280, and 290. For exemplary purposes only it will be assumed that these time periods are each 48 hours and 20 minutes long.

During the time period from 200 to 207, devices participate in a MANET for the purpose of fetching short-lived certificates, provided the other devices are within range. The time period from 200 to 207 is a MEP. The time periods from 210 to 217, 220 to 227, 230 to 237, 240 to 247, and 250 to 257 are all also MEPs. For purposes of discussion it can be assumed that the time between the start of each of these MEPs is 24 hours; e.g. the time between 200 and 210 is 24 hours. Assuming that these time periods are 20 minutes in length, then times 204, 214, 224, 234, 244, and 254 all represent midpoints in these time periods, dividing them into 10-minute halves.

The CA tracks which devices have received their updated short-lived certificates. This is accomplished by having the devices send acknowledgements to the CA when they have received their short-lived certificates. In order to prevent an attacker from faking an acknowledgement, the acknowledgements include a signature of the signature of the certificate, signed by the device's private key. The CA would only update the status if the signature were good, determined by a verification of the signature with the particular device's public key.

It can be assumed that at time 210, all of the devices have short-lived certificates with validity period 260. At time 210, devices 100, 110, 120, 130, 140, and 150 will all attempt to establish an ad-hoc network. Suppose that all devices except 140 and 150 are within range as shown in FIG. 1. Devices 140 and 150 are both out of range of any other device and have no route to CA 50. Devices 100, 110, 120, and 130 successfully join an ad-hoc network. At time 214 the devices 100, 110, 120, and 130, having successfully joined the ad-hoc network each send a message to CA 50 requesting an updated certificate, CA 50 upon receiving such a message sends a message in reply containing the requesting device's certificate with validity period represented by the time bar 270. When each device receives its certificate, it verifies the signature in the certificate with CA 50's public key; if the certificate is valid, the device will sign the signature on the certificate with its private key and send this signature to CA 50 as the acknowledgement. Upon receiving the acknowledgement, CA 50 will check the validity of the signature using the device's public key and if it is verified to be the device's signature, the CA will mark the device as having received its certificate. Shortly after time 214, the CA will have marked 100, 110, 120, and 130 as having received their certificates for time period 270. Since devices 140 and 150 are out-of-range, the CA will not have marked them as having received their certificates for time period 270. At time 217, the devices are allowed to discontinue the ad-hoc network that was established at time 210.

After time 217, devices 140 and 150 are aware that they were unable to communicate with the CA 50 to fetch their short-lived certificates for time period 270. Because devices

140 and 150 do not have their most recent certificates, between time 217 and 220, devices 140 and 150 will continue to attempt to retrieve their certificates. As time progresses without a device having retrieved its short-lived certificate, it may take progressively more desperate measures to retrieve its certificate. After time 217, devices 140 and 150, if they are within range of an access point such as AP 100, should immediately connect in order to fetch their short-lived certificates from CA 50. Since it would consume more power from a device's power source, a progressively more desperate measure would be to participate in ad-hoc networks with other devices whenever possible; at a first time period after time 217 but before time 220, devices would take this progressively more desperate measure. Devices such as 140 and 150 may be multi-mode devices, including the capability to use a cellular packet data system such as cdma2000 packet data or GPRS packet data in addition to the short-range radio technology. The coverage of a cellular packet data system will typically be much greater than that of short-range radio technology. However, short-range radio technology typically uses an unlicensed band and is either free or very low-cost. For a dual-mode device, a progressively more desperate, and more expensive, measure to retrieve a short-lived certificate involves establishing a packet data call through the cellular packet data system for the purpose of retrieving a short-lived certificate. At a second time period after the first time period but before time 220, dual-mode devices would take this even more desperate measure to retrieve a short-lived certificate.

At time 220, devices 100, 110, 120, 130, 140, and 150 make another periodic attempt to establish a MANET for the purpose of fetching short-lived certificates. The establishment of the MANET during the time period from 220 to 224 represents a last opportunity of certificate retrieval for a device unable to fetch its short-lived certificate since time 210. After time 224, the CA 50 takes the progressively more desperate measure of distributing such a device's certificate to other devices that have established a route to the CA. Assume that by time 220 device 140 has returned to its position as shown in FIG. 1, that device 150 remains out of range of any other device, and that devices 100, 110, 120, and 130 are as pictured in FIG. 1. At time 220, device 140 sends a message to CA 50 requesting its certificate. Upon receiving the message, CA 50 sends to device 140 its short-lived certificate. Preferably the short-lived certificate would be the latest—the one with validity period 280. Upon receiving the certificate, device 140 sends acknowledgement to CA 50. Upon receiving the acknowledgement, the CA marks device 140 as having received an up-to-date certificate.

After time 224, devices that are able to will send messages to CA 50 requesting up-to-date short-lived certificates. CA 50 will respond to each request by sending the requesting device's short-lived certificate. In addition, CA 50 will also send to each device requesting its own up-to-date short-lived certificate the short-lived certificate of devices that it has not marked as having a certificate that expires at the end of validity period 270 or later. Thus any device that was not able to retrieve its certificate since the previous MEP will have its certificate delivered to devices that are able to retrieve their certificates during the current MEP. At time 224 devices 110, 120, and 130 send requests to CA 50 for their most recent short-lived certificate. CA 50 responds to each with the device's certificate and also the certificate of device 150 since device 150 is not marked as having a certificate that expires at the end of validity period 270 or later. Since device 140 already received its up-to-date short-lived certificate between times 220 and 224, it need not receive the certificate again after time 224. Nevertheless, device 140 will send a request message to CA 50. CA 50 will respond with a short-lived certificate of device 150 (i.e. the short-lived certificate of devices that it has not marked as having a certificate that expires at the end of validity period 270 or later). The CA could also include the up-to-date short-lived certificate of device 140, but for bandwidth savings, it preferably would not since it had already been delivered.

Subsequently, during the time between 227 and 230, device 150 encounters device 130 and 120 and wishes to establish an ad-hoc network, but all of these devices are out-of-range of AP 100 or any other AP and so cannot establish a route to CA 50. Accordingly, either device 120 or 130 will be able to authenticate device 150, using its copy of a currently valid certificate for device 150. When device 150 interacts with either of these devices, it preferably receives and stores a copy of its up-to-date certificate from the other device. In this way, device 150 can present its certificate if it subsequently interacts with another device that was unable to receive the certificate during the time period from 224 to 227. It should be noted that even though device 150 has already received its certificate via another device, it should send an acknowledgement of this to CA 50 at any subsequent opportunity prior to time 234. This may be done via the establishment of an ad-hoc network with a route to CA or alternatively by interaction with an AP. The acknowledgement should include a signature of the certificate signed by 150's private key. If the CA receives this acknowledgement prior to time 234, it can avoid distributing 150's new certificate to other devices from time 234 to 237. After device 150 retrieves its certificate from the other device, the other device need not store the certificate any longer; it may free the memory resource. The device 150 also sends the same acknowledgement as sent to CA 50 to a device storing its certificate and the device would verify the signature in the acknowledgement before deleting the certificate from memory.

In the event that a large number of devices are unable to communicate with a CA for a long period of time, the number of other devices' certificates that the CA would be required to send to a device (and the number the device is required to store in its memory) could become large. This could happen, for example, if a large number of devices were turned off. In this case, some of the certificates could be excluded if either bandwidth or memory is a limitation. The CA could selectively exclude some devices' certificates from the ones sent to a particular device if bandwidth to the device is a problem. If memory in a device is the limitation, the device could choose not to store some of the certificates sent by the CA. If it becomes necessary to not send certificates or to not store certificates due to bandwidth or memory limitations, preference is preferably given to certificates of those devices that have communicated with the CA most recently. Certificates of the devices most recently in communication with the CA should be sent and stored rather than the certificates of the devices least recently in communication with the CA.

As described above, FIG. 1 and FIG. 2 show the update of short-lived certificates based upon establishing MANETs during MEPs at pre-determined times. Alternately the times of the MEPs could be determined dynamically. The devices could keep a record of when they encounter other devices in their ad-hoc group, regardless of whether or not they actually join an ad-hoc network. This could be, for example, via the bluetooth service discovery process for devices using bluetooth wireless technology. When a device interacts with the CA, for example when retrieving certificate information during a MEP, it sends this information to the CA. The CA would then have this information for all devices in an ad-hoc group. The CA could analyze this information to determine times when many devices were in proximity of others with a route to the internet and attempt to predict good times for the devices to establish ad-hoc networks for updating certificates. The CA could, for example, make a measurement of the number of devices in range of one another during various time periods of the same duration and choose for the MEP the time period where there are the most devices in range of one another. The dynamically determined MEP time period could be distributed to the devices in a certificate using a predetermined relationship with the validity times of a certificate. Alternately, separate fields of the certificate could be dedicated to define the MEP time period.

In the above example, one might assume that the certificates being distributed had all certificate information one might expect in a certificate. It should be noted that for short-lived certificates most information remains the same when the certificate is updated. Since a list of certificates may be stored in multiple devices, saving memory is a concern and it may be preferable to use a short form of the information when updating short-lived certificates. The full certificate may be stored in the device, but the CA may distribute only the information that has changed—the timing information and the signature. The other information may be implicitly covered by the signature is the hash and signature from the CA. However, when presenting a certificate, a device would present the full certificate.

Figure 3:
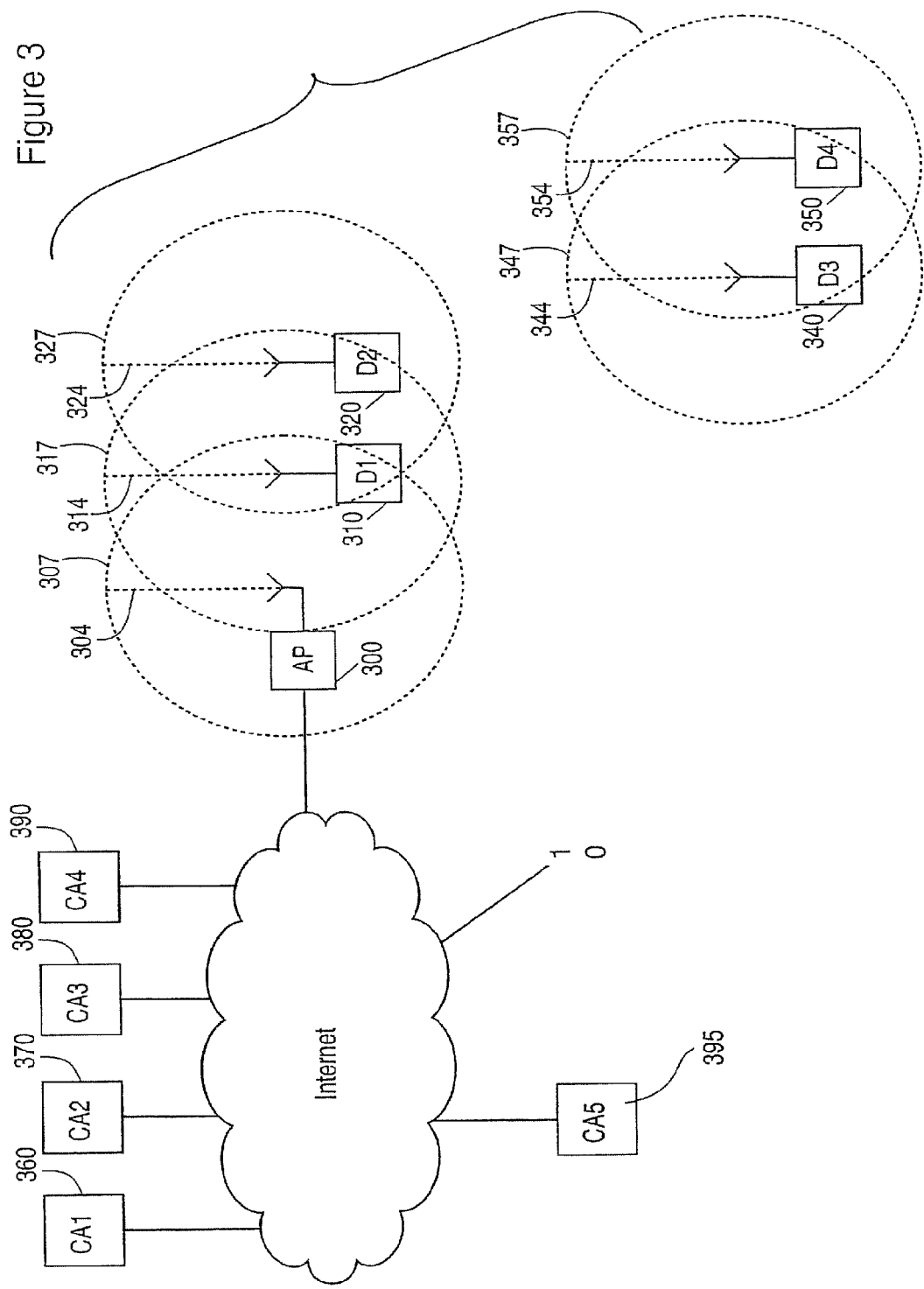
FIG. 3 shows a number of wireless devices communication with one another and authenticating each other through different certificate authorities.

In the above example, all devices had the same CA and all had embedded root keys of the same CA. In some situations it may be desirable to have devices with different CAs authenticate each other, as shown in FIG. 3.

Wireless devices 300, 310, 320, 340, and 350 contain radios that can communicate with one another using a common air interface such as the Bluetooth radio specification or one of the IEEE 802.11 physical layer specifications. In addition to a wireless interface, the AP 300 has connectivity to the internet 10. Nodes 110, 120, 140, and 150 have no direct connectivity to the internet. The radio in each wireless device has a limited range. The range of AP 300 is represented by circle 307 having radius 304. Nodes 310 (D1), 320 (D2), 340 (D3), and 350 (D4) similarly are assumed to have ranges represented by circles 317, 327, 347, and 357, respectively, having radii 310, 320, 340, and 350, respectively.

D2 is only within range of DI. D1 is within range of AP and D2. AP is only within range of DI. D3 and D4 are only within range of each other. D2 has connectivity to the internet 10 routed through D1 via an ad-hoc network. Devices D1, D2, D3, and D4 each has for its CA 360 (CA1), 370 (CA2), 380 (CA3), and 390 (CA4), respectively, and each has an embedded root certificate of its CA. In addition CA1 has generated a certificate including CA2's public key and CA3 has generated a certificate including CA4's public key. Also CA5 has generated certificates including public keys for CA1 and for CA3. In addition to the root key for CA2, D2 also has embedded the root key of CA5. Also, in addition to the root key for CA4, D4 also has embedded the root key of CA5.

In a first example, an AP such as AP 300 may fetch and store certificates on behalf of the devices with which it can exchange packets. It should be noted that the same would apply if D2 and D1 both were within range of AP 300 and that the routing function of D1 were not needed by D2. When new short-lived certificates are issued, AP 300 fetches them from the appropriate CA. When a new short-lived certificate is issued for D1, AP fetches it from CA1. When a new short-lived certificate is issued for D2, AP fetches it from CA2. When a device with which AP 300 can exchange packets needs to authenticate another node, it fetches the node's certificate from AP 300. In addition, AP 300 queries the devices with which it can exchange packets for their embedded root keys. Based upon the devices present with which AP 300 can exchange packets and the root keys of the devices, AP 300 will also fetch certificates to enable the devices to authenticate each other. Because D1 does not have the root key of CA2 embedded, AP fetches the certificate signed by CA1 including CA2's public key. When DI needs to authenticate D2, it will send a request to AP 300 indicating that it is authenticating D2. AP 300 will send to D1 D2's certificate and the certificate signed by CA1 including CA2's public key; this will enable D1 to authenticate D2. Because D2 does not have the root key of CA1 but does have the root key of CA5 embedded, AP fetches the certificate signed by CA5 including CA1's public key. When D2 needs to authenticate DI, it will send a request to AP 300 indicating that it is authenticating D1. AP 300 will send to D2 DI's certificate and the certificate signed by CA5 including CA1's public key; this will enable D2 to authenticate D1.

In a second example, a device's own CA will be responsible for both distributing the device's short-lived certificate and for fetching any other certificates needed to allow the device's short-lived certificate to be validated. Each device will be responsible for collecting the embedded root keys of other devices with which it comes in contact with via either direct radio contact or via presence in the same ad-hoc network. When fetching its short-lived certificates from the CA a device will report these other devices and their root certificates to its CA. Based upon the root certificates for a device, the CA will determine other certificates needed to allow that device to be authenticated and will return those other certificates to the requesting device along with its short-lived certificate. When D3 and D4 encounter one another, D3 receives D4's embedded root keys (CA4 and CA5); likewise D4 receives D3's embedded root key (CA3). When D3 requests its short-lived certificate from CA3, it reports D4's root keys (CA4 and CA5). To enable D4 to authenticate D3, CA3 sends to D3, along with its short-lived certificate, the certificate signed by CA5 including CAS's public key. When D4 requests its short-lived certificate from CA4, it reports D3's root key (CA3). To enable D3 to authenticate D4, CA4 sends to D4, along with its short-lived certificate, the certificate signed by CA3 including CA4's public key. Thus when the devices authenticate each other, by sending the certificates received from their CAs, the appropriate information will be available.

In addition to having an AP such as AP 300 fetch short-lived certificates from a CA on behalf of devices with which it can exchange packets, CAs may sometimes send, "push", short-lived certificates directly to APs. For example, suppose that a certain device is within range of AP 300 most of the time, but not at the moment when the device's short-lived certificate is generated. The device's CA can keep track of the APs that the device is commonly within range of and push the short-lived certificates to all of these APs when the short-lived certificate is generated. Thus when the device enters the vicinity of the AP such as AP 300, its short-lived certificate is immediately available and a round trip through the internet to the CA can be avoided.

Because a certificate is valid only for a certain time period, a device must have a correct time source to be able to validate a certificate. Methods are known for setting time in the Internet; see, for example, RFC 1305 and draft-ietf-stime-ntpauth-00.txt. This reference is available at http://www.ietf.org/internet-drafts/draft-ietf-stime-ntpauth-00.txt. However, a low-cost wireless device in many cases will not be set to the correct time out-of-the-box since a battery or other power source is not likely to be installed from the factory. It is desirable to be able to securely set the time in such an out-of-the-box device when power is applied. Furthermore, a portable low-cost wireless device with the time correctly set is unlikely to have enough energy to maintain the correct time when its power source is removed. Thus a device owner changing the battery in such a device may compromise the device's ability to validate certificates. Therefore, it is desirable to be able to quickly reacquire the correct time when power is reapplied in such a circumstance.

Figure 4:
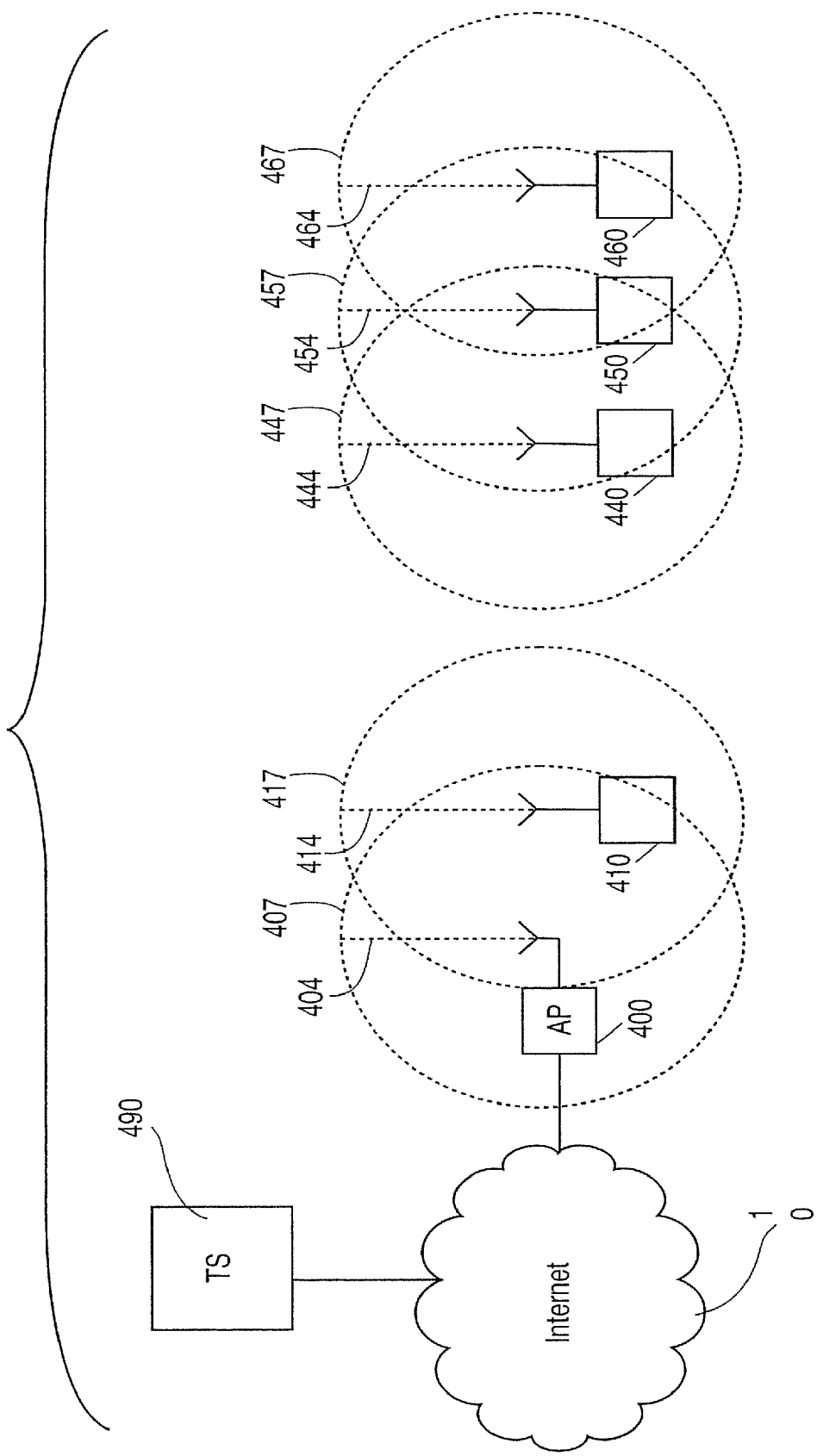
FIG. 4 shows an example of a method by which the time in a portable low-cost wireless device is securely set.

Referring to FIG. 4, illustrates schematically a method of securely setting the time in a portable low-cost wireless device. The wireless devices, 400, 410, 440, 450, and 460, communicate with one another via radios using a common air interface, such as the Bluetooth radio specification or one of the IEEE 802.11 physical layer specifications. In addition to a wireless interface, the AP 400 has connectivity to the internet 10. Nodes 410, 440, 450, and 460 have no direct connectivity to the internet. The radio in each wireless device has a limited range. The range of AP 400 is represented by circle 407 having radius 404. Nodes 410, 440, 450, and 460 similarly are assumed to have ranges represented by circles 417, 447, 457, and 467, respectively, having radii 414, 444, 454, and 464, respectively. AP 400 and device 410 are within range of one another. Device 450 is within range of both device 440 and device 460. Devices 440, 450, and 460 all are without connectivity to the internet. Device 410 has connectivity to the internet 10 via AP 400. TS 490 is a secure and accurate time source. TS 490 has an accurate clock for maintaining the current time. TS 490 also includes tamper-proof signing ability with the private key of a public key/private key pair used for signing. Devices 410, 440, 450, and 460 all have embedded in memory the public key associated with the private key in the tamper-proof hardware of TS 490. The memory used for storing the public key survives the loss of power by the device such as occurs when the device has no battery.

For a first example, assume that device 410 is an out-of-the-box device whose battery has just been inserted. When the battery is inserted into device 410, circuitry in the device determines via well-known means that it is a cold boot up and that the clock is not accurately set. Device 410 establishes a connection with AP 400; this may include device 410 presenting its certificate to AP 400. Device 410 must first set its clock accurately and securely before trusting AP 400. Device 410 will generate a random challenge to send to TS 490. Device 410 will send a message to AP 400 including the random challenge and information about TS 490, such as an internet address, which allows AP 400 to communicate with TS 490. AP 400 sends the random challenge to TS 490. When TS 490 receives the random challenge, it takes the current time from its clock, concatenates the random challenge to it, performs a hash function over the time and challenge, signs the hash with its private key, and returns the time, challenge, and signature to AP 400 which then forwards it to device 410. If the challenge returned matches the challenge that was sent and the round trip time is acceptably short, device 410 then checks the signature using its embedded public key of TS 490. If the signature is verified, device 410 will set its clock to the received time. The accuracy of the time is a function of the round trip time. With its clock now set, device 410 can now validate a certificate from AP 400 or from any other device. If AP 400 and device 410 are exchanging certificates, device 410 could send the challenge to AP 400 in the same message as device 410's certificate; AP 400 could then send its certificate to device 410 in the same message as the time, challenge, and signature.

The above example shows a case where the device is within range of an AP when it is first powered on. If device 400 had not been within range of AP 400, it could have still used TS 490 to set the time via an ad-hoc network with one or more intermediate nodes routing packets to TS 490 via AP 400. If device 400 were in a situation where there is no direct connectivity to the internet, it should take the first possible opportunity to set the clock via an ad-hoc network. If device 400 is a multi-mode device, including the capability to use a cellular packet data system, it could take a more desperate measure to set the time if there were an immediate need to validate a certificate. The device could establish a packet data call through the cellular packet data system for the purpose of communicating with TS 490 to set the time.

For a second example, assume that device 450 is powered-on and that its clock already has the correct time, having been set during a previous interaction with TS 490 through AP 400. Also assume that device 460 is an out-of-the-box device whose battery has just been inserted. When the battery is inserted into device 460, circuitry in the device determines via well-known means that it is a cold boot up and that the clock is not accurately set. Since device 460 has no way of connecting to the internet, it cannot immediately set its clock using TS 490. Assume that device 450 and device 460 are owned and controlled by the same person. The person wishes to establish a trusted relationship between these two devices and does this using well known means. A suitable example would be by using the procedure described in the Bluetooth Security Architecture paper. Once this trusted relationship is established, device 460 trusts device 450 and can use device 450 as a time source. When device 460 determines that it has established a trusted relationship with device 450, it requests the time from device 450 using a secure channel. Device 450 responds with the current time from its clock. If device 460 receives the response within a preset time period after sending the request, it will set its clock to the time sent by device 450. Device 460 can then use its own time source to validate certificates. Subsequently when device 460 is able to establish a connection to the internet such as via AP 400, it may reset its clock as described in the first example using TS 490; this would correct any accumulation of errors as the time is propagated from device to device.

In yet another example, assume that both device 440 and device 450 are powered-on and that their clocks already have the correct time, having been set during previous interactions with TS 490 through AP 400. Devices 440 and 450 have just been brought within radio range of one another. Although it is shown in FIG. 4 that devices 440 and 450 may communicate directly with one another, the following time-setting method would be applicable if devices 440 and 450 were merely in the same MANET and other devices routed packets between them. Devices 440 and 450 have no shared secret between them, but each has a public/private key pair and up-to-date short-lived certificates and they have a trusted relationship that can be determined via certificates and well-known public key methods. The devices discover one another, exchange certificates, and determine via public key methods that they have a trusted relationship. The devices then establish a shared secret. Each device then stores the identity of the other, the shared secret, and an expiration time in a non-volatile memory, i.e. a type of memory where the information will still be present when power is reapplied after a device's source of power has been lost.

After a period of time, the owner of device 440 begins the process of changing the battery. The owner removes device 440's battery and the clock ceases to function. The owner then inserts a new battery and power is restored to device 440. When the battery is inserted into device 440, circuitry in the device determines via well-known means that it is a cold boot up and that the clock is not accurately set. Preferably device 440 would set its clock via TS 490, but device 440 determines that there is no path to the internet which • can be used to set its clock via TS 490. Device 440 discovers that it has a path to device 450 (either within radio range or routed through a MANET). Because device 440 has a shared secret with device 450 stored in non-volatile memory, it communicates with device 450 and uses the shared secret to authenticate device 450 via well-known means. After successfully authenticating device 450, device 440 requests the time from device 450. Device 450 responds with the current time from its clock. The communication between devices 440 and 450 is preferably encrypted. If device 440 receives the response within a preset time period after sending the request, it will set its clock to the time sent by device 450. Device 440 can then use its own time source to validate certificates. Subsequently when device 440 is able to establish a connection to the internet such as via AP 400, it may reset its clock as described in the first example using TS 490. This would correct any accumulation of errors as the time is propagated from device to device. The shared secret stored in non-volatile memory is intended to be a temporary measure used to assist a nearby device in setting the time. A device without a power source and whose clock has stopped could be vulnerable to an attacker trying to incorrectly set the time in the device if the attacker had the shared secret. The expiration time of the shared secret (to be observed by devices with power sources and whose clocks are still accurate) should therefore be set to a relatively short time. In this way, the risk of the shared secret being compromised is minimized. When a device with a power source and an accurate clock determines that the expiration time of the shared secret has passed, it should destroy the shared secret in its memory.

Some devices with a very limited power source may benefit from the short-lived certificate distribution methods described above. A secure token used for authentication is an example of such a device. A secure token is a small-sized device that might typically be carried on a key chain. The battery on a token would be expected to last a very long time and would not typically be rechargeable. Such a token would typically not participate in an ad-hoc network because of the requirement to preserve the life of the power source. Such a token could be paired with another device that the owner of the token carries with him such as a Bluetooth PDA or cellular phone that does typically participate in ad-hoc networks. The paired device would take the responsibility of fetching short-lived certificates on behalf of the token and delivering short-lived certificates to the token when fetched.

It is known for a device to present to a validating party a pointer to its certificate rather than the certificate itself. According to the WAP standard, the client may present a Uniform Resource Locator (URL), as the pointer, to a certificate to a server rather than the certificate itself. Being a node on the interne, the server may fetch the certificate using the URL. When the wireless link between the client and the server is very slow in a WAP system, presenting an URL rather than the certificate itself can significantly speed up the certificate validation. The reason is that the URL is much shorter than the certificate itself and thus takes less time to transmit over the air interface. The saved time on the air interface will be smaller than the additional time required for the server to fetch the certificate using the URL.

Figure 5:
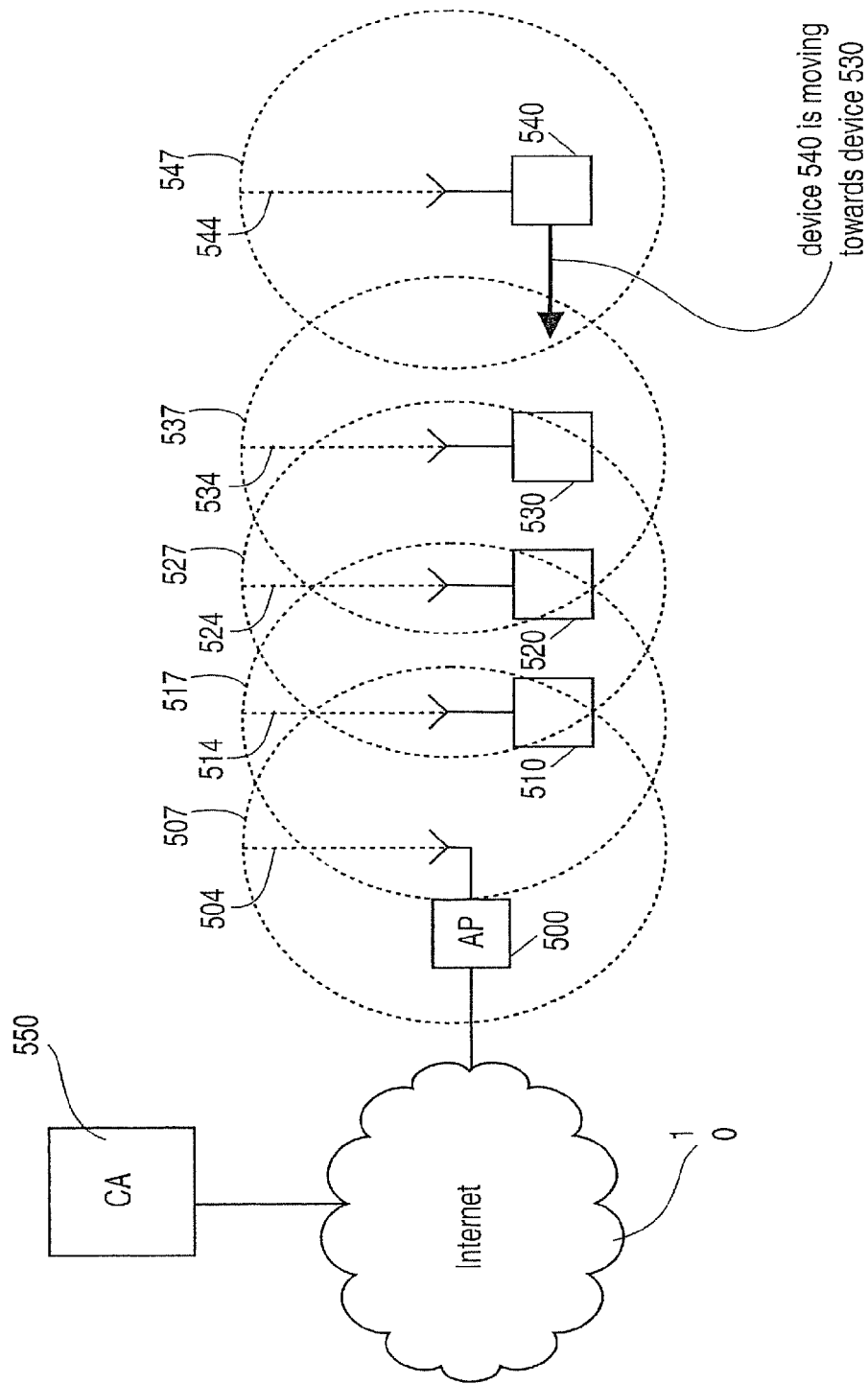
FIG. 5 shows the use of a pointer to a certificate in a MANET.

Referring to FIG. 5, in order to show the use of a pointer to a certificate in a MANET. Suppose that devices 500, 510, 520, and 530 are all involved in a MANET. Device 530 has connectivity to the internet by routing packets through devices 520, 510, and 500. CA 550 is the Certificate Authority. Device 540 is shown as not being involved in the MANET, but is moving towards device 530. When device 540 is within range of device 530, it will attempt to join the ad-hoc network. Device 530 will authenticate device 540 using its certificate. Device 540 has an URL that points to its short-lived certificate. CA 550 stores device 540's certificate. The URL to the certificate points to CA 550; this would be, for example, by having CA 550's server name as part of the URL. In order to retrieve the certificate using the URL, device 530 first retrieves the IP address of CA 550 using the internet Domain Name System (DNS). The request is routed through devices 520, 510, and 500. The IP address is then sent to device 530, routed through devices 500, 510, and 520. Once the IP address is known, device 530 sends the request to CA 550, routed through devices 520, 510, and 500. The certificate is then sent from the CA 550 to device 530, routed through devices 500, 510, and 520. Device 530 can then validate the certificate. The two traversals through the MANET clearly add significant time to the validation; they also consume bandwidth in the MANET and drain the batteries of devices 510, 520, and 530. One traversal could potentially be saved by including CA 550's IP address in the URL rather than its name, but the traversal still required would still be expensive. Furthermore, the current technology typically used for MANETs has a high enough transmission speed between nodes that the time savings achieved by sending an URL from node 540 to 530 rather than a certificate is negligible. In addition, a path to the CA for fetching a certificate using an URL may not even be present. In most cases it is clearly preferable for a device in an ad-hoc networking environment to present a certificate to another device rather than an URL.

As described with respect to the previous figures, however, when short-lived certificates are used and a device's short-lived certificate expires before it has been able to fetch a new one, the device will not be able to present a valid certificate to a validating device. In this situation, it would be desirable for the device to be able to present a pointer to a certificate rather than the certificate itself. Since the device has not yet been authenticated, it would not have the authority to fetch the certificate from the CA itself since it has not yet been permitted to join the MANET; i.e. it is assumed that, prior to authentication, intermediate nodes in the MANET would not route packets on behalf of the device. Even if the device were permitted to fetch the certificate itself, this could require two more message exchanges than presenting an URL. For example, in the example of FIG. 5, a request from device 540 for its updated certificate would be routed to the CA 550 through devices 530, 520, 510, and 500. The response would then be routed through devices 500, 510, 520, and 530. By presenting an URL with an IP address included, the time required to send the certificate from 530 to 540 and then back to 530 could be eliminated.

Preferably a device will present a short-lived certificate to a validating party when the device has an up-to-date short-lived certificate to send. When a device does not have an up-to-date short-lived certificate to send, it preferably presents a pointer, such as an URL, to a validating party and then the validating party fetches the certificate using the pointer. Alternately, a device could always present both its latest short-lived certificate and a pointer to a short-lived certificate to a validating party; the validating party could then use the presented certificate if it is valid or fetch the latest certificate using the presented pointer if the presented certificate is not valid.

Multiple possibilities exist for the format of the URL presented by a device that uses short-lived certificates. One option is to have the URL always remain the same. In this case, when the CA issues a new certificate, it changes the certificate that is pointed to, that is, the certificate that will be returned to a requesting device, but the URL presented by the requesting device would remain the same. Another option would be to have a first part of the URL be fixed, and also to include time as a second part of the URL presented to the CA and to have the CA return a certificate based upon the time in the URL. In this way, in the future it would be very easy to check if there were valid certificates for a device at various times in the past; this could be used to prove that a transaction took place.

Previous examples of methods of distributing short-lived certificates such as described with respect to FIG. 1 and FIG. 2 take advantage of known pre-defined groups of mobile devices to enable certificates to be "pushed" to devices with connectivity to the internet. For example, if devices A and B are part of a group and device A is disconnected from the internet for an extended period of time and its short-lived certificate expires, after a certain point, the CA will recognize that device A has not retrieved its certificate. The CA would then "push" device A's certificate to other devices in the group that do have connectivity to the internet. For example, the CA would "push", or send the certificate to device B if device B has connectivity to the internet when A does not. Subsequently, if B interacts with A, it can send to A its short-lived certificate. It would also be desirable for a device with no connection to the internet to be able participate in ad-hoc networks and to receive its certificate even if it is not part of a pre-defined group of devices.

Figure 6A:
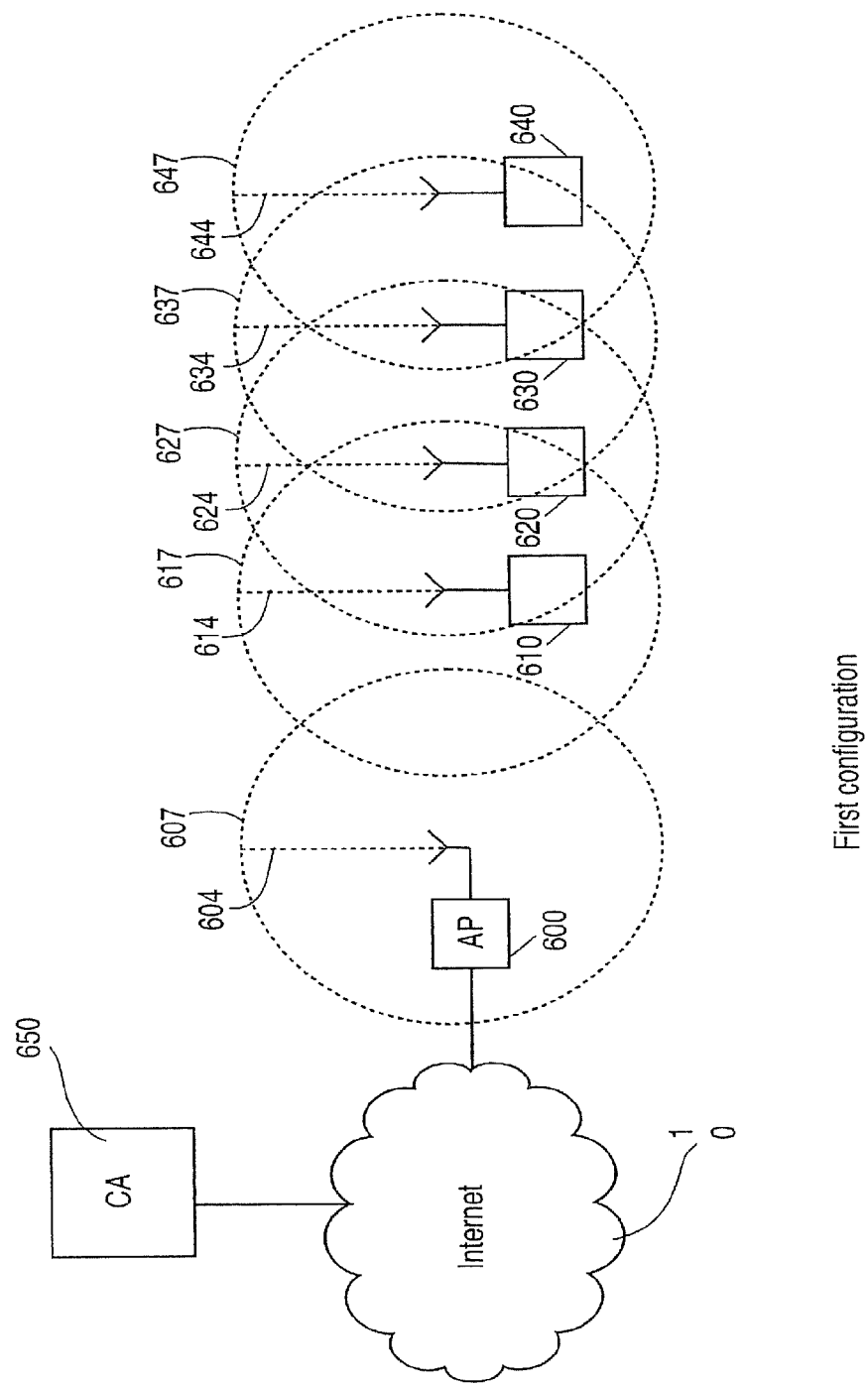
FIGS. 6A and 6B show two examples of a method by which a non-connected device that is not part of a specific ad-hoc group can receive its certificate.
Figure 6B:
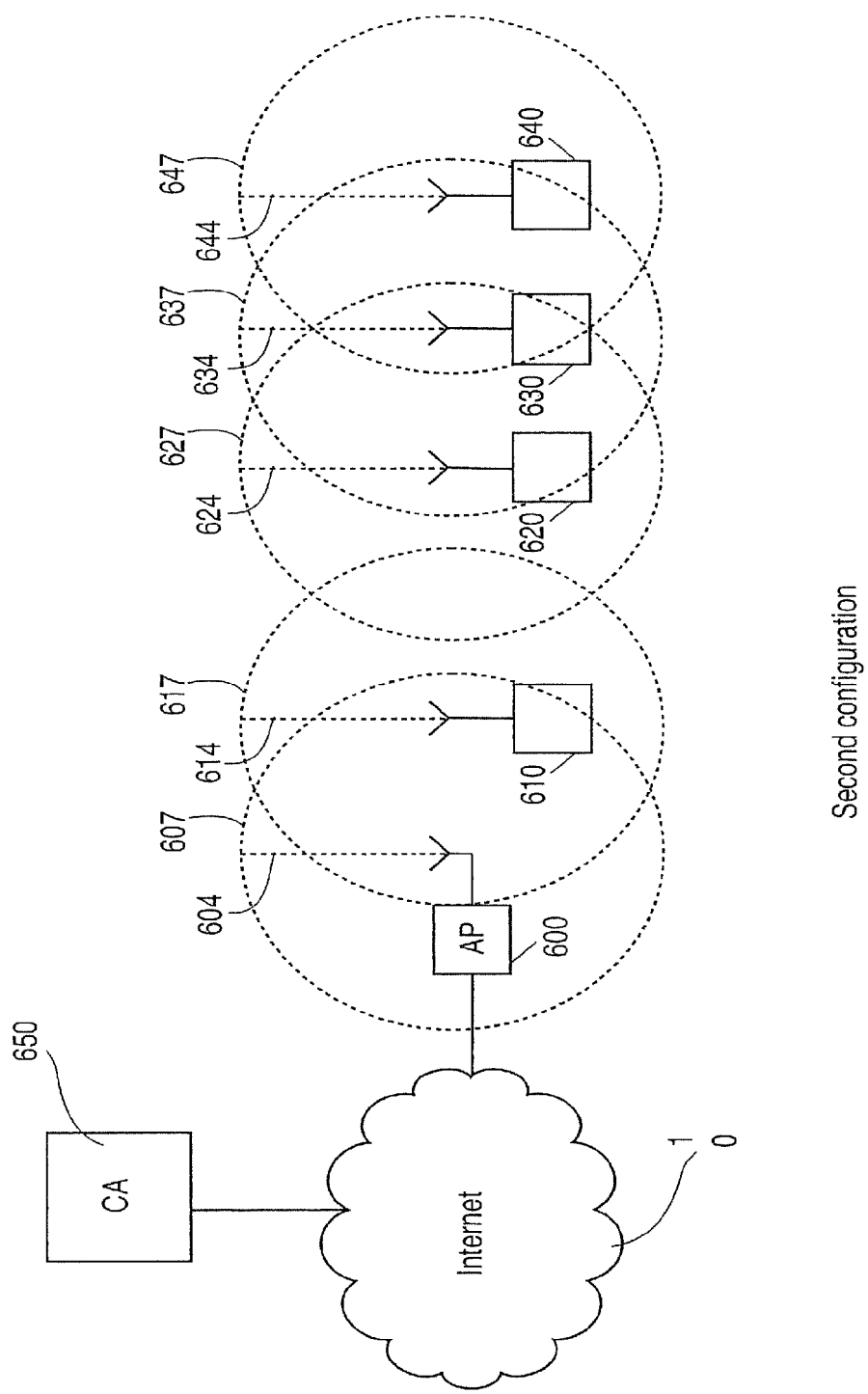

As shown in FIGS. 6A and 6B, nevertheless a non-connected device that is not part of a specific ad-hoc group can receive its certificate. At a first time, device 640 attempts to retrieve its certificate, but it is unable to because there is no connectivity to the internet. Until a second time, device 640 continues to attempt to retrieve its certificate. If by the second time, device 640 has been unable to retrieve its certificate, it will begin requesting assistance from other devices. For example, device 640 would send a request to all neighboring devices within radio range (such as device 630). Furthermore, the request can be broadcast to all devices participating within the same MANET. For example, in the first configuration shown in FIG. 6A, device 640 would broadcast the request to devices 630, 620, and 610 since they are all members of the MANET. The request tells the other devices that if they subsequently have a path to the internet that they are to fetch an up-to-date short-lived certificate on behalf of device 640. Upon receiving the request that includes the identity of device 640 and an address of device 640's CA, a device will record the request in its local memory. For example, device 610 receives a request and stores it in its local memory. In the second configuration shown in FIG. 6B, assume that device 610, after having received the request from device 640, moves out of range of the MANET, but within range of the AP. Since device 610 had stored the request, and it now has a route to the internet through device 600, it will fetch device 640's up-to-date certificate from device 640's CA 650. Upon receiving the certificate, device 610 will store it in its local memory. Subsequently, if device 610 joins the same MANET as device 640, it will send the certificate to device 640. If before the third time device 610 joins yet another MANET or encounters other devices in radio range before joining the same MANET as device 640 or coming within radio range of device 640, it may broadcast the certificate to the devices in the other MANET or to the other devices within radio range. If there are any devices in the other MANET or within radio range that have a stored request to fetch device 640's certificate up to the third time, any such device will store the certificate in its local memory; alternately, all devices in the other MANET or within radio range store the certificate in their local memory up until the third time and upon joining the same MANET as device 640 or coming within radio range of device 640, such a device could deliver the certificate. Upon receiving its certificate, device 640 would sign its new certificate with its private key and broadcast the signature as an acknowledgement to other devices within radio range or within the MANET. When another device which had stored the request from device 640 receives the acknowledgement, it can destroy the request in its local memory and reallocate the freed memory to other purposes. If the third time passes and a device that has stored a request from device 640 in its local memory, it can also destroy the request in its local memory and reallocate the freed memory to other purposes.

It should be noted that depending upon the available memory in a device, the device might not be able to store requests and certificates for all requesting devices. In this case the devices whose requests and certificates would be stored could be selected randomly or pseudo randomly. An example of how this could be done would be to input a requesting device's address into a hash function and to honor the request if the output of the hash function is within a predetermined range; the range could vary depending upon the amount of available memory.

The above-described embodiments of the invention are intended to be examples of the present invention and alterations and modifications may be effected thereto, by those of skill in the art, without departing from the scope of the invention which is defined solely by the claims appended hereto.

The invention claimed is:

1. A method of a first wireless device validating a second wireless device, wherein the first and second wireless devices are operable to communicate with each other, the method comprising:
   the first wireless device obtaining a certificate for the second wireless device;
   said first wireless device determining if the certificate has expired; and
   if said certificate has expired, the first wireless device obtaining another certificate for the second wireless device using a pointer provided by the second wireless device and validating the second wireless device using the other certificate.

2. The method according to claim 1, wherein the certificate is obtained from the second wireless device.

3. The method according to claim 1, wherein if the certificate has not expired, the first wireless device uses the certificate to validate the second wireless device.

4. The method according to claim 1, wherein the certificate and the pointer are provided by the second wireless device at the same time.

5. The method according to claim 1, wherein the first wireless device detects the second wireless device approaching it to join an ad-hoc network, the ad-hoc network including the first wireless device.

6. The method according to claim 1, wherein the pointer comprises a uniform resource locator (URL).

7. The method according to claim 6, wherein the URL comprises a time.

8. The method according to claim 6, wherein the pointer further comprises an internet protocol (IP) address associated with a certificate authority (CA).

9. The method according to claim 1, wherein the pointer comprises an internet protocol (IP) address associated with a certificate authority (CA).

10. A first wireless device operable to communicate with at least a second wireless device, the first wireless device comprising a processor operable to:
   obtain a certificate for the second wireless device;
   determine if the certificate has expired; and
   if said certificate has expired, obtain another certificate for the second wireless device using a pointer provided by the second wireless device, and validate the second wireless device using the other certificate.

11. The first wireless device according to claim 10, wherein the certificate is obtained from the second wireless device.

12. The first wireless device according to claim 10, wherein if the certificate has not expired, the processor is further operable to use the certificate to validate the second wireless device.

13. The first wireless device according to claim 10, wherein the certificate and the pointer are provided by the second wireless device at the same time.

14. The first wireless device according to claim 10, wherein the processor is further operable to obtain a detection of the second wireless device approaching it to join an ad-hoc network, the ad-hoc network including the first wireless device.

15. The first wireless device according to claim 10, wherein the pointer comprises a uniform resource locator (URL).

16. The first wireless device according to claim 15, wherein the URL comprises a time.

17. The first wireless device according to claim 15, wherein the pointer further comprises an internet protocol (IP) address associated with a certificate authority (CA).

18. The first wireless device according to claim 10, wherein the pointer comprises an internet protocol (IP) address associated with a certificate authority (CA).

* * * * *